Feb. 5, 1963 D. E. GRANT 3,076,347
POWER TRANSMISSION MECHANISM
Filed Oct. 29, 1959 3 Sheets-Sheet 1

INVENTOR
DONALD E. GRANT
BY- Fetherstonhaugh & Co.
ATTORNEYS

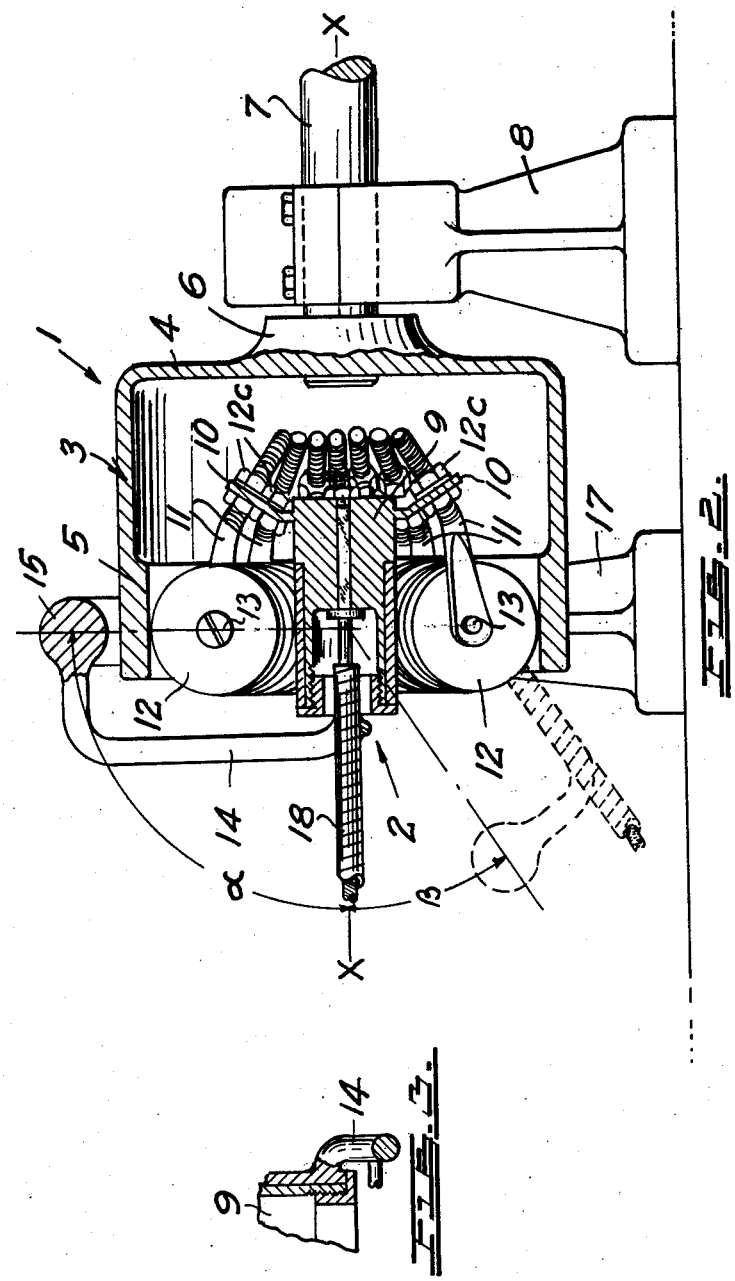

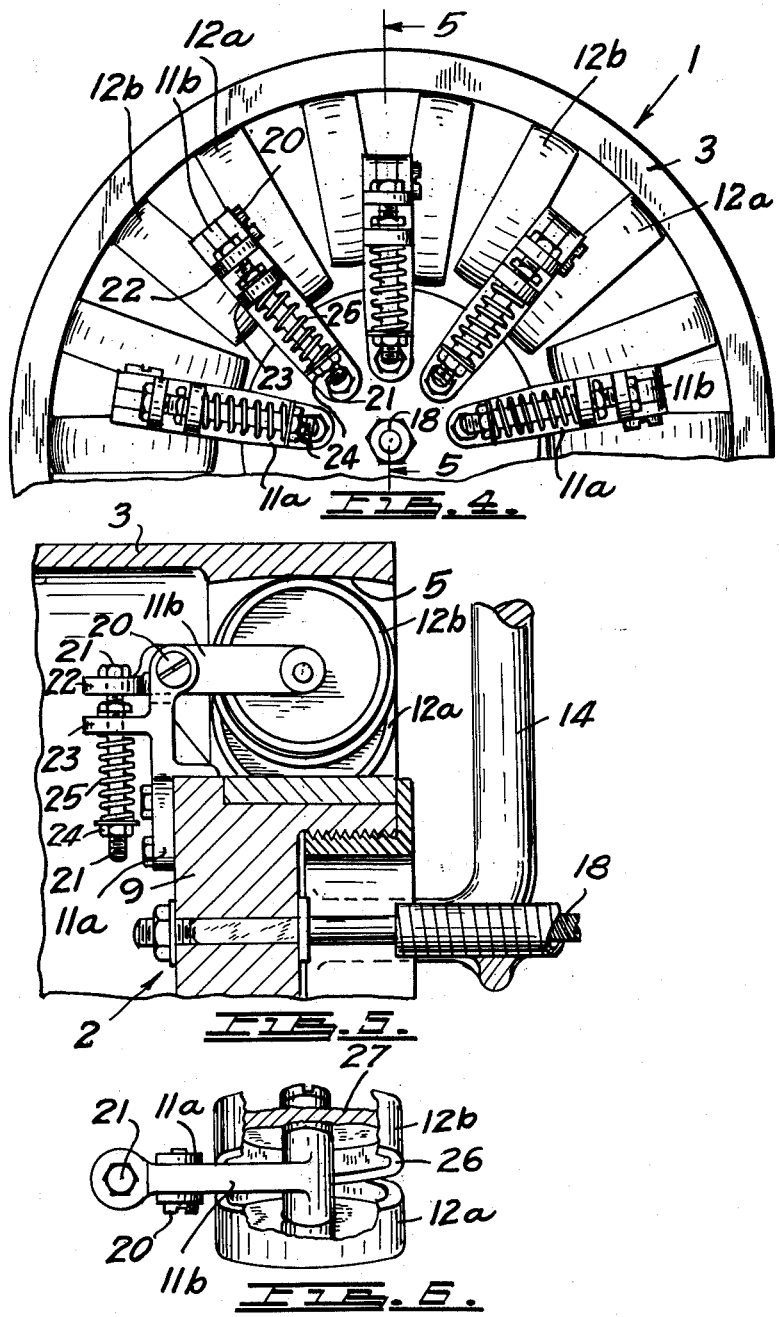

United States Patent Office 3,076,347
Patented Feb. 5, 1963

3,076,347
POWER TRANSMISSION MECHANISM
Donald E. Grant, Maynooth, Ontario, Canada
Filed Oct. 29, 1959, Ser. No. 849,605
8 Claims. (Cl. 74—190)

The present invention relates to a power transmission mechanism and more particularly to a transmission mechanism for varying the transmission of power from a driving element to a driven element.

Transmission mechanisms at present in use for transmitting power from a driving element to a driven element have a pair of co-acting members movable into and out of absolute engagement with each other. In other words, no variation in the transfer of power is effected through the transmission mechanism. Moreover there can be no reversal of torque between the driving element and the driven element, such reversal being obtained by appropriate gearing mechanism.

It is an object of the present invention to provide a transmission mechanism which varies the amount of power transmitted from a driving element to a driven element. Another object of the invention is to provide a transmission mechanism which is capable of reversing the torque transmitted through it from a driving element to a driven element. Still another object of the invention is to provide an infinite variation in the transmission of power positively from no load to full load and reversely to a percentage of full load.

The invention in its broadest aspect consists, in a power transmission mechanism, of a pair of co-acting members comprising an annular member rotatable about its longitudinal axis and having a frictional inner surface, a unit having a plurality of frictional elements arranged to define a torus, each of said elements being freely rotatable in a sectional plane of the torus, the outer frictional circumference of the torus being adapted to engage the frictional inner surface of the annular member, means to rotate the unit about a transverse axis of the annular member into and out of the circumferential plane of the annular member, and a flexible transmission shaft fixed to the unit at its longitudinal toroidal axis.

Illustrative embodiments of the invention will now be described with reference to the accompanying drawings in which:

FIG. 2 is a sectional view of the transmission mechanism taken along the line 2—2 of FIG. 1;

FIG. 3 is a section of the transmission mechanism taken along the line 3—3 of FIG. 1;

FIG. 4 is a front elevation of a portion of the transmission mechanism as seen in FIG. 1, showing a modification in the mounting of the rotatable frictional elements;

FIG. 5 is a sectional view of the modified transmission mechanism taken along the line 5—5 of FIG. 4; and FIG. 6 is a view in elevation, partly broken away and with the spring element removed, of a pair of rotatable frictional elements and their mounting shown in FIGS. 4 and 5.

Figure 1:
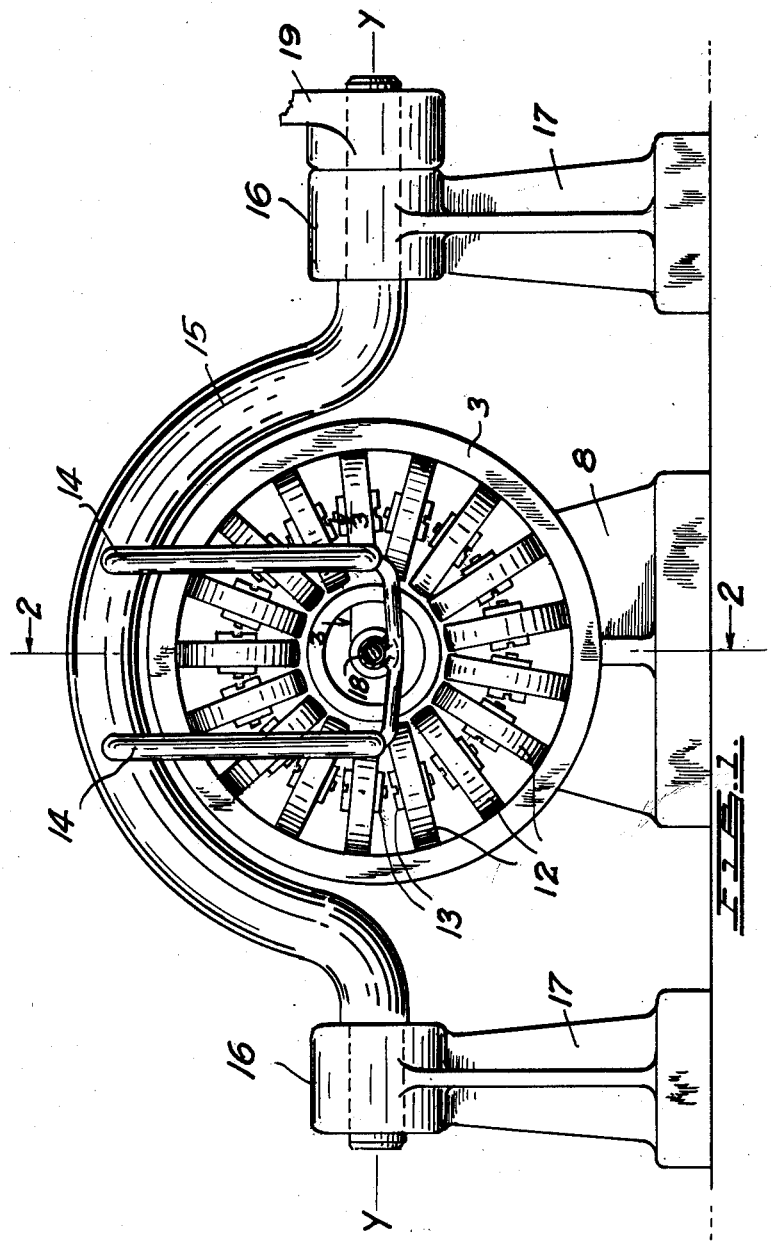
FIG. 1 is a front elevation of the transmission mechanism in fully engaged position.

As shown in FIGS. 1 to 3 the transmission mechanism of the invention consists essentially of a pair of co-acting parts in the form of an annular member 1 rotatable about its longitudinal axis and a unit 2 rotatable about both a longitudinal and a transverse axis.

Annular member 1 comprises a cylindrical drum 3 closed at one end by face 4. A flat raised shoulder 5 adjacent the open end of drum 3 provides an internal annular friction surface. Face 4 carries a boss 6 in which the end of a driving shaft 7 is keyed. Shaft 7, journalled in a support 8, is coaxial with the longitudinal axis X—X of drum 3. For the purposes of the invention annular member 1 could equally well be driven in a planetary manner if desired. Any suitable source of power, not shown, could be used to rotate driving shaft 7.

Unit 2 comprises a central hub 9 having fixed to it adjacent one end a dish-shaped annular flange 10 which circumscribes the longitudinal axis of the hub. Arms 11 each threaded at one end and laterally flattened at the other end are secured to flange 10 by locking nuts 12c. A plurality of arms 11 secured in this manner are circumferentially spaced about hub 9 and are bent to overhang the hub. Friction elements 12 in the form of discs each having an axle stud 13 are rotatably mounted one on the overhanging flattened free end of each arm 11. Discs 12 are radially positioned and circumferentially spaced about hub 9 to define a torus. The bend of arms 11 is such that the outer diameter of this torus is equal to the internal diameter of shoulder 5. Moreover, friction discs 12 are positioned in such a manner that their planes of rotation pass through the longitudinal axis of hub 9.

Unit 2 is freely supported within the confines of drum 3 by brackets 14 which depend from a cross bar 15 rotatably set at each end in journals 16 which are mounted on supports 17. Unit 2 is so positioned within drum 3 that the outer circumference of the torus defined by friction discs 12 coincides with the inner circumference of shoulder 5, thus enabling the shoulder to act upon each disc. The axes of journal 16 are coincident with the projection of a transverse axis Y—Y of shoulder 5 (which axis Y—Y will also be a transverse axis of the torus defined by friction discs 12). Cross bar 15 is arched or bowed in its central portion to clear drum 3. Brackets 14 are U-shaped to clear the end of drum 3 carrying shoulder 5, two such brackets being used to give clearance for a flexible driven shaft 18 which is keyed coaxially in the end of hub 9 facing outwardly from drum 3.

Any suitable means may be used to rotate cross bar 15 in journal 16, depending upon the use to which the transmission mechanism is to be put. In the drawings a lever arm 19 keyed to one end of cross bar 15 is illustrated for simplicity.

In the operation of the device the transmission mechanism is fully engaged when positioned as shown in FIGS. 1 and 2, friction discs 12 each being in contact with shoulder 5. In this fully engaged position the total power of driving shaft 7 is transmitted to driven shaft 18 because the torque in shoulder 5 is applied to friction discs 12 at right angles to their individual planes of rotation on arms 11. Hence discs 12 will not rotate about their individual axles 13 but will be moved as a group in a torus about the longitudinal axis of hub 9 to which shaft 18 is keyed.

When unit 2 is rotated about transverse axis Y—Y through angle α (see FIG. 2) discs 12 will disengage successively from shoulder 5, beginning with those discs remote from axis Y—Y. As this is done, direction of the rotation force of shoulder 5 on each disc 12 not yet disengaged is altered with respect to the plane of rotation of the disc about its axle 13, thus transferring a component of the force to rotate that disc. Consequently as unit 2 is rotated about transverse axis Y—Y through angle α from a fully engaged position the speed ratio of driving shaft 7 to driven shaft 18 will be gradually increased until when the rotation has been carried through 90° idling will occur. At the idling position only diametrically opposed discs 12 lying in the region of transverse axis Y—Y will be in contact with shoulder 5 and the force of the shoulder will act only to rotate them freely about their axis 13.

Continuing the rotation of unit 2 past 90° from its fully engaged position through angle β (again see FIG. 2) a component of the rotational force of shoulder 5 acting on discs 12 coming into contact with the shoulder will again be normal to the rotational plane of those elements, such component increasing as angle β is increased and causing a uniform increase in the torque transmitted to the driven shaft 18.

Brackets 14 will act as a stop to prevent the rotation of unit 2 about a transverse axis Y—Y through an angle β greater than can be accommodated by the flexibility of driven shaft 18 by bearing against the open end of drum 3 carrying shoulder 5 and will also prevent the overriding of unit 2 when it is brought into the fully engaged position.

In a modification of the device illustrated in FIGS. 4–6 a set of two friction discs 12 are eccentrically mounted on each arm 11. This embodiment also shows means to increase and regulate the pressure of discs 12 against shoulder 5 by articulating arm 11 into a fixed portion 11a and a free portion 11b pivoted on portion 11a by a pin 20. A bolt 21 passing through an eye 22 in the articulated portion 11b of arm 11 at its end remote from disc 12 and passing through a further eye 23 fixed laterally to portion 11a of arm 11 carries a nut 24 at its free end. A compressed spring 25 helically wound about bolt 21 bears against eye 23 and nut 24 by adjustment of nut 24 the pressure of disc 12 against shoulder 5 can be varied.

To increase further the total frictional surface of unit 2 the number of discs 12 may be increased by constructing them as shown in FIG. 6 to have a wide rim 26 carried by a thin flange 27. In this manner rims of larger diametered discs 12a may override the rims of smaller diametered discs 12b positioned alternately between them.

The material of discs 12 and shoulder 5 may be varied to produce a suitable and efficient friction surface. For instance nylon, rubber or fibre may be employed. The material of shoulder 5 may be different from that of drum 3 by constructing the shoulder in the form of a separate ring which may conveniently be made replaceable. Shoulder 5 may have a convex inner surface as shown in FIG. 5 to increase the area of contact between it and discs 12.

What I claim is:

1. In a power transmission mechanism a pair of coacting members comprising an annular member rotatable about its longitudinal axis and having a frictional inner surface, a unit having a plurality of frictional elements arranged to define a torus, each of said elements being freely rotatable in a sectional plane of the torus, the outer frictional circumference of the torus being adapted to engage the frictional inner surface of the annular member, means to rotate the unit about a transverse axis of the annular member into and out of the circumferential plane of the annular member, and a flexible transmission shaft fixed to the unit at its longitudinal toroidal axis.

2. A mechanism as claimed in claim 1, wherein the annular member is a drum mounted coaxially on the end of the driving shaft.

3. A mechanism as claimed in claim 1, wherein the freely rotatable elements are discs mounted on a central hub, the axis of rotation of each disc lying in the circumferential axis of the torus.

4. A mechanism as claimed in claim 1, wherein the freely rotatable elements are radially mounted on, and circumferentially spaced about a central hub.

5. A mechanism as claimed in claim 1, wherein the annular member is a friction ring mounted within a drum.

6. A power transmission mechanism of the type having a drive shaft, a driven shaft and a pair of coacting members associated therewith, comprising an annular member associated with the drive shaft and rotatable thereby about its longitudinal axis, said annular member having a friction surface on its inner side, a hub freely supported within the annular member and associated through its longitudinal axis of rotation with the driven shaft, a plurality of freely rotatable friction elements radially mounted on and circumferentially spaced about the hub to define a torus having its outer frictional circumference engageable with the friction surface of the annular member, and means to rotate the hub about a transverse axis of the annular member at least 90° from the plane of the annular member, said driven shaft being flexible.

7. A power transmission mechanism as claimed in claim 6, wherein the annular member is a drum mounted at one end coaxially on the driving shaft, the hub being freely supported in the end of the drum remote from the driving shaft.

8. A power transmission mechanism as claimed in claim 6, wherein the hub carries arms fixed thereto, said arms carrying at their free ends the freely rotatable friction elements.

References Cited in the file of this patent

UNITED STATES PATENTS

| 1,452,946 | Weiss | Apr. 24, 1923 |
| 1,541,882 | Weiss | June 16, 1925 |
| 1,826,408 | Tenney | Oct. 6, 1931 |
| 2,682,776 | Morgan | July 6, 1954 |

FOREIGN PATENTS

| 364,375 | Germany | Mar. 23, 1922 |
| 799,672 | France | Apr. 11, 1936 |